(12) United States Patent
Kim et al.

(10) Patent No.: US 11,232,538 B2
(45) Date of Patent: Jan. 25, 2022

(54) METHOD AND APPARATUS FOR PROCESSING HOLOGRAM IMAGE DATA

(71) Applicants: SAMSUNG ELECTRONICS CO., LTD., Suwon-si (KR); University of Seoul Industry Cooperation Foundation, Seoul (KR)

(72) Inventors: Hojung Kim, Suwon-si (KR); Kichul Kim, Seoul (KR); Yongkyu Kim, Hwaseong-si (KR)

(73) Assignees: SAMSUNG ELECTRONICS CO., LTD., Suwon-si (KR); University of Seoul Industry Cooperation Foundation, Seoul (KR)

( * ) Notice: Subject to any disclaimer, the term of this patent is extended or adjusted under 35 U.S.C. 154(b) by 157 days.

(21) Appl. No.: 16/805,932

(22) Filed: Mar. 2, 2020

(65) Prior Publication Data

US 2020/0311865 A1 Oct. 1, 2020

(30) Foreign Application Priority Data

Apr. 1, 2019 (KR) .................. 10-2019-0037966

(51) Int. Cl.
*G06T 3/20* (2006.01)
*G06T 7/37* (2017.01)
*G02B 27/01* (2006.01)

(52) U.S. Cl.
CPC ............ *G06T 3/20* (2013.01); *G02B 27/0172* (2013.01); *G06T 7/37* (2017.01);
(Continued)

(58) Field of Classification Search
CPC ... G06T 3/20; G06T 7/37; G06T 2207/20056; G02B 27/0172; G02B 2027/014; G02B 2027/0174
See application file for complete search history.

(56) References Cited

U.S. PATENT DOCUMENTS

| | | | |
|---|---|---|---|
| 6,353,689 B1 * | 3/2002 | Kanamaru | ............... G06T 5/10 382/280 |
| 7,054,504 B2 * | 5/2006 | Ludwig | ..................... G06T 5/10 382/280 |

(Continued)

FOREIGN PATENT DOCUMENTS

| EP | 3629099 A1 | 4/2020 |
|---|---|---|
| KR | 10-2008-0094038 A | 10/2008 |

(Continued)

OTHER PUBLICATIONS

Communication dated Jul. 10, 2020 issued by the European Patent Office in European Application No. 20163612.3.
(Continued)

*Primary Examiner* — Manav Seth
(74) *Attorney, Agent, or Firm* — Sughrue Mion, PLLC (57) ABSTRACT

An image processing method and apparatus are provided. The image processing apparatus includes a receiver configured to receive image data; and a processor configured to generate first data by performing a Fourier calculation on the received image data, generate second data by performing prism phase computation on the first data, generate third data by adding the first data and the second data, and perform encoding based on the third data.

23 Claims, 9 Drawing Sheets

(52) U.S. Cl.
CPC ............ *G02B 2027/014* (2013.01); *G02B 2027/0174* (2013.01); *G06T 2207/20056* (2013.01)

(56) References Cited

U.S. PATENT DOCUMENTS

| | | | | |
|---|---|---|---|---|
| 8,218,211 | B2 * | 7/2012 | Kroll | G03H 1/2205 359/9 |
| 8,244,058 | B1 * | 8/2012 | Intwala | G06T 5/50 382/275 |
| 8,487,980 | B2 * | 7/2013 | Kroll | G02B 26/0875 348/40 |
| 8,542,945 | B1 * | 9/2013 | Ludwig | G06T 5/003 382/280 |
| 8,897,590 | B2 * | 11/2014 | Ludwig | G02B 27/46 382/255 |
| 9,046,734 | B2 * | 6/2015 | Haussler | H04N 13/376 |
| 9,514,517 | B2 * | 12/2016 | Christmas | G03H 1/16 |
| 9,562,760 | B2 * | 2/2017 | Braker | G01S 7/4814 |
| 9,829,860 | B2 * | 11/2017 | Schwerdtner | G03H 1/08 |
| 9,946,224 | B2 * | 4/2018 | Kroll | G03H 1/0005 |
| 10,088,802 | B2 | 10/2018 | Kim et al. | |
| 10,088,803 | B2 * | 10/2018 | Seo | G03H 1/0808 |
| 10,444,419 | B2 * | 10/2019 | Bhargava | G02B 6/0035 |
| 10,545,328 | B2 * | 1/2020 | Kim | G06F 17/142 |
| 10,761,481 | B2 * | 9/2020 | Kroll | G03H 1/0808 |
| 10,809,663 | B2 * | 10/2020 | Kim | G06T 1/20 |
| 10,969,744 | B2 * | 4/2021 | Seo | G03H 1/0841 |
| 10,996,628 | B2 * | 5/2021 | Yoon | G03H 1/0841 |
| 2010/0040224 | A1 | 2/2010 | Javidi et al. | |
| 2010/0149139 | A1 * | 6/2010 | Kroll | G03H 1/2205 345/204 |
| 2010/0271675 | A1 | 10/2010 | Leister et al. | |
| 2011/0019249 | A1 | 1/2011 | Leister | |
| 2013/0321899 | A1 * | 12/2013 | Haussler | H04N 13/373 359/315 |
| 2015/0077818 | A1 * | 3/2015 | Tsang | G03H 1/0841 359/9 |
| 2015/0323899 | A1 * | 11/2015 | Schwerdtner | G03H 1/28 359/9 |
| 2016/0320752 | A1 * | 11/2016 | Seo | G03H 1/0486 |
| 2016/0379606 | A1 * | 12/2016 | Kollin | G06T 3/4038 345/428 |
| 2017/0038727 | A1 * | 2/2017 | Kim | G06T 9/00 |
| 2017/0091916 | A1 * | 3/2017 | Kim | G06T 5/10 |
| 2017/0103503 | A1 * | 4/2017 | Kim | G11C 11/1657 |
| 2017/0148151 | A1 * | 5/2017 | Oh | G06T 7/0002 |
| 2018/0150027 | A1 * | 5/2018 | Kim | G03H 1/16 |
| 2018/0157024 | A1 * | 6/2018 | Kim | G06F 17/142 |
| 2018/0364642 | A1 * | 12/2018 | Seo | G03H 1/2645 |
| 2019/0155217 | A1 * | 5/2019 | Kim | G03H 1/0891 |
| 2020/0041958 | A1 * | 2/2020 | Seo | G03H 1/0486 |
| 2020/0105498 | A1 * | 4/2020 | Harada | G03H 1/16 |

FOREIGN PATENT DOCUMENTS

| | | |
|---|---|---|
| KR | 10-1225741 B1 | 1/2013 |
| KR | 10-2017-0016158 A | 2/2017 |
| KR | 10-2018-0057550 A | 5/2018 |

OTHER PUBLICATIONS

Abookasis, D., et al., "Computer-generated holograms of three-dimensional objects synthesized from their multiple angular viewpoints", Journal of the Optical Society of America, vol. 20, No. 8, Aug. 2003, XP007905028, pp. 1537-1545.

* cited by examiner

METHOD AND APPARATUS FOR PROCESSING HOLOGRAM IMAGE DATA

CROSS-REFERENCE TO RELATED APPLICATION

This application claims priority from Korean Patent Application No. 10-2019-0037966, filed on Apr. 1, 2019, in the Korean Intellectual Property Office, the disclosure of which is incorporated herein in its entirety by reference.

BACKGROUND

1. Field

Example embodiments of the present disclosure relate to processing hologram image data, and more particularly, to methods and apparatuses for processing hologram image data capable of increasing quality of a hologram image without significantly increasing the amount of computation of a processor.

2. Description of the Related Art

Glasses-type methods and non-glasses-type methods are widely used for realizing three-dimensional (3D) images. Examples of glasses-type methods include deflected glasses-type methods and shutter glasses-type methods, and examples of non-glasses-type methods include lenticular methods and parallax barrier methods. When these methods are used, there is a limit to the number of viewpoints that may be implemented due to binocular parallax. Also, these methods cause viewers to feel tired due to the difference between the depth perceived by the brain and the focus of the eyes.

Recently, holographic 3D image display methods, which provide full parallax and are capable of making the depth perceived by the brain consistent with the focus of the eyes, have been gradually put to practical use. According to such a holographic display technique, when light is radiated onto a hologram pattern having recorded thereon an interference pattern obtained by interference between light and object light reflected from an original object, the light is diffracted and an image of the original object is reproduced. When a currently commercialized holographic display technique is used, a computer-generated hologram (CGH), rather than a hologram pattern obtained by directly exposing an original object to light, is provided as an electrical signal to a spatial light modulator. Then, the spatial light modulator forms a hologram pattern and diffracts light according to an input CGH signal, thereby generating a 3D image.

To generate CGHs, image processing apparatuses perform a very large number of computations to compute a hologram value for each location in a hologram plane. Thus, when image processing is performed, a large number of computations take a lot of time. Accordingly, various methods are performed to try to reduce the number of computations and the computation time for performing image processing.

SUMMARY

Example embodiments provide methods and apparatuses for processing hologram image data capable of increasing quality of a hologram image without significantly increasing the amount of computation of a processor.

Additional aspects will be set forth in part in the description which follows and, in part, will be apparent from the description, or may be learned by practice of the presented embodiments.

According to an aspect of an example embodiment, there is provided an image processing apparatus including: a receiver configured to receive image data; and a processor configured to generate first data by performing a Fourier calculation on the received image data, generate second data by performing prism phase computation on the first data, generate third data by adding the first data and the second data, and perform encoding based on the third data.

The processor may be further configured to generate the third data by adding an absolute value of a real part of the first data and a real part of the second data.

The image processing apparatus may further include a memory configured to store the first data while the processor performs the prism phase computation, and the processor may be further configured to generate the third data by outputting the real part of the first data stored in the memory and computing the absolute value of the real part of the first data output from the memory.

The image processing apparatus may further include a memory, and the processor may be further configured to compute the absolute value of the real part of the first data and store the absolute value of the real part of the first data while performing the prism phase computation, and generate the third data by outputting the absolute value of the real part of the first data stored in the memory and adding the absolute value of the real part of the first data output from the memory and the real part of the second data.

The processor may be further configured to perform the prism phase computation by multiplying the first data by a prism phase filter value.

The first data may be denoted by a complex number x+jy, the prism phase filter value may be denoted by a complex number z+jw, the second data may be denoted by a complex number (xz−yw)+j(xw+yz), and the third data may be denoted by (xz−yw)+|x|.

An absolute value |z+jw| of the prism phase filter value may be 1.

The processor may be further configured to encode the third data into n-bit unsigned integer values, and n is a natural number.

The processor may be further configured to generate the first data by performing a first Fourier calculation based on a distance between a display on which an image is to be displayed and an observer's pupil, performing a focus term calculation and a depth addition, and performing a second Fourier calculation based on a distance between the observer's pupil and a retina.

The processor may be further configured to generate the first data, generate the second data, and generate the third data individually for each of left eye image data and right eye image data and add the left eye image data and the right eye image data before performing the encoding based on the third data.

The processor may be further configured to generate the first data individually for each of left eye image data and right eye image data and add the left eye image data and the right eye image data before generating the second data and the third data.

According to an aspect of another example embodiment, there is provided an image processing method including: receiving image data; generating first data by performing a Fourier calculation on the received image data; generating second data by performing prism phase computation on the first data; generate third data by adding the first data and the second data; and performing encoding based on the third data.

The generating the third data may include adding an absolute value of a real part of the first data and a real part of the second data.

The image processing method may further include storing the first data in a memory during the prism phase computation, and the generating the third data may include outputting the real part of the first data stored in the memory and computing the absolute value of the real part of the first data output from the memory.

The image processing method may further include computing the absolute value of the real part of the first data and storing the absolute value of the real part of the first data in a memory while performing the prism phase computation, and the generating the third data may include outputting the absolute value of the real part of the first data stored in the memory and adding the absolute value of the real part of the first data output from the memory and the real part of the second data.

The performing the prism phase computation may include multiplying the first data by a prism phase filter value.

The first data may be denoted by a complex number $x+jy$, the prism phase filter value may be denoted by a complex number $z+jw$, the second data may be denoted by a complex number $(xz-yw)+j(xw+yz)$, and the third data may be denoted by $(xz-yw)+|x|$.

An absolute value $|z+jw|$ of the prism phase filter value may be 1.

The performing the encoding may include encoding the third data into n-bit unsigned integer values, and n is a natural number.

The generating the first data by performing the Fourier calculation may include: performing a first Fourier calculation based on a distance between a display on which an image is to be displayed and an observer's pupil; performing a focus term calculation and a depth addition; and performing a second Fourier calculation based on a distance between the observer's pupil and a retina.

The generating the first data, the generating the second data, and the generating the third data may be performed individually for each of left eye image data and right eye image data, and the image processing method may further include adding the left eye image data and the right eye image data before the performing the encoding based on the third data.

The generating the first data may be performed individually for each of left eye image data and right eye image data, and the image processing method may further include adding the left eye image data and the right eye image data before the generating of the second data and the third data.

According to an aspect of another example embodiment, there is provided a non-transitory computer-readable recording medium having recorded thereon a program which is executed by a computer to perform an image processing method including: receiving image data; generating first data by performing a Fourier calculation on the received image data; generating second data by performing prism phase computation on the first data; generate third data by adding the first data and the second data; and performing encoding based on the third data.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects.

Hereinafter, with reference to the accompanying drawings, a method and apparatus for processing hologram image data will be described in detail. Like reference numerals refer to like elements throughout, and in the drawings, sizes of elements may be exaggerated for clarity and convenience of explanation. The embodiments described below are merely examples, and various modifications may be possible from the embodiments. In a layer structure described below, an expression "above" or "on" may include not only "immediately on in a contact manner" but also "on in a non-contact manner".

The terms used herein are those general terms currently widely used in the art in consideration of functions in regard to the embodiments, but the terms may vary according to the intentions of those of ordinary skill in the art, precedents, or new technology in the art. Also, in some cases, there may be terms that are optionally selected by the applicant, and the meanings thereof will be described in detail in the corresponding portions of the description of the embodiments. Thus, the terms used herein should be understood not as simple names but based on the meaning of the terms and the overall description of the embodiments.

Also, when something is referred to as "including" a component, another component may be further included unless specified otherwise. Also, as used herein, the terms "units" and "modules" may refer to units that perform at least one function or operation, and the units may be implemented as hardware or software or a combination of hardware and software.

Figure 1:
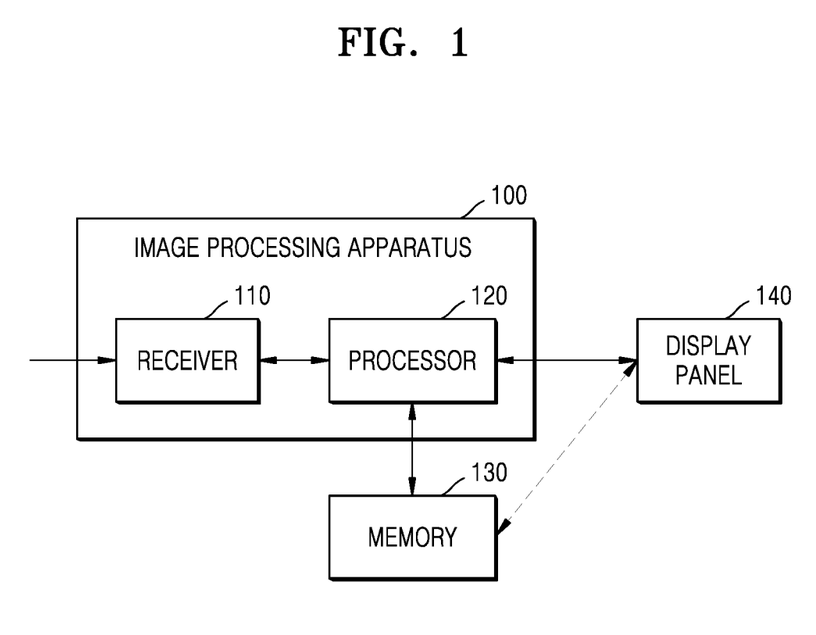
FIG. 1 is a schematic block diagram of a configuration of an image processing apparatus for processing hologram image data, according to an example embodiment.

FIG. 1 is a schematic block diagram of a configuration of an image processing apparatus 100 for processing hologram image data, according to an example embodiment. It will be understood by those of ordinary skill in the art that other general-purpose elements may be further included in addition to the elements shown in FIG. 1. It will be understood by those of ordinary skill in the art that, alternatively, according to other embodiments, some of the elements shown in FIG. 1 may be omitted.

Referring to FIG. 1, the image processing apparatus 100 may include a receiver 110 and a processor 120. The image processing apparatus 100 may further include a memory 130 and/or a display panel 140. The image processing apparatus 100 may be an electronic apparatus such as a computer, a mobile device, a display apparatus, a wearable apparatus, or a digital camera, and the processor 120 may be a central processing unit (CPU), a graphics processing unit (GPU), or the like.

The receiver 110 may receive hologram image data. The receiver 110 may include a read apparatus for reading data from a storage medium storing hologram image data, or may be connected to an external apparatus and receive hologram image data from the external apparatus. The receiver 110 may further include a camera for directly generating hologram image data. The hologram image data received by the receiver 110 may include color information and depth information regarding each pixel of a hologram image to be reproduced. When a moving image is reproduced, the receiver 110 may receive hologram image data in units of frames. For example, when the processor 120 generates a computer-generated hologram (CGH) by using a layer-based algorithm, hologram image data of one frame may include color image data and depth image data.

The color image data may be data representing a plurality of colors for a plane of each layer. For example, the color image data may include red image data, blue image data, and green image data. Also, the hologram image data may include left eye image data and right eye image data. For example, the left eye image data may include left eye red image data, left eye green image data, left eye blue image data, and left eye depth image data, and the right eye image data may include right eye red image data, right eye green image data, right eye blue image data, and right eye depth image data.

The receiver 110 may store image data in the memory 130. The processor 120 may use the image data stored in the memory 130 to perform a CGH calculation with a layer-based algorithm, thereby generating CGH image data. For example, the processor 120 may perform a calculation by dividing a reproduction region of a hologram image based on depth. The processor 120 may perform, for example, a Fourier transform, a Fast Fourier Transform (FFT), an Inverse Fourier Transform (IFT), or Inverse Fast Fourier Transform (IFFT), on image data of each divided layer based on depth. For example, the processor 120 may perform an FFT twice or more times and obtain data regarding each pixel of a hologram image.

The display panel 140 includes a plurality of pixels arranged two-dimensionally. The display panel 140 may be, for example, a transmission-type spatial light modulator (SLM) based on liquid crystal display (LCD). Alternatively, the display panel 140 may include a reflection-type SLM such as a liquid crystal on silicon (LCoS) panel, a digital light projection (DLP) panel, or a digital micromirror device (DMD) panel. The display panel 140 may display a hologram pattern by using CGH data generated in the processor 120.

Figure 2:
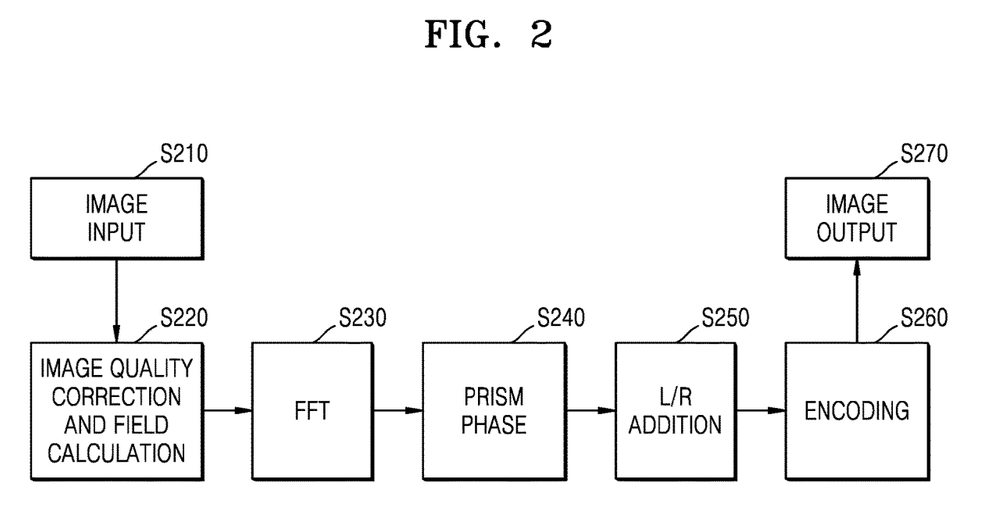
FIG. 2 is a flowchart of an image processing process for processing hologram image data in the image processing apparatus of FIG. 1.

FIG. 2 is a flowchart of an image processing process for processing hologram image data in the image processing apparatus 100 of FIG. 1.

In operation S210, the image processing apparatus 100 may receive hologram image data by using the receiver 110. The image processing apparatus 100 may receive image data in units of frames. In other words, the image processing apparatus 100 may receive and process image data of one frame, and then receive and process image data of a subsequent frame. For example, as described above, when a layer-based algorithm is used, image data of one frame may include color image data and depth image data. More specifically, the image data may include left eye red image data, left eye green image data, left eye blue image data, left eye depth image data, right eye red image data, right eye green image data, right eye blue image data, and right eye depth image data.

After receiving the image data, in operation S220, the image processing apparatus 100 may perform image quality correction and field calculation. For example, the processor 120 of the image processing apparatus 100 may correct the image data to increase image quality of the image data.

In operation S230, the processor 120 may transform the image data by using a layer-based algorithm. The layer-based algorithm may be a method of dividing a reproduction region of a hologram into a plurality of plane layers based on depth and processing data of each divided layer. For example, based on depth information of input depth image data, the processor 120 may separate color image data according to layers. The number of layers to be separated may be previously determined with respect to the image processing apparatus 100.

Then, the processor 120 may perform a Fourier transform or an FFT on color data of each of the divided plane layers. For example, the processor 120 may perform an FFT on a two-dimensional (2D) matrix type of image data. The processor 120 may perform a one-dimensional (1D) FFT twice to accomplish a 2D FFT. The processor 120 may perform a 1D FFT on the image data row-wise and perform a 1D FFT on a result of the 1D Fourier transform column-wise. The processor 120 may transform the image data into complex image data having complex values through such an FFT.

The processor 120 may include a plurality of cores, and the plurality of cores may perform an FFT on the image data in parallel. For example, the processor 120 may assign image data of each plane to the plurality of cores, and the plurality of cores may perform an FFT on the assigned image data.

Figure 3:
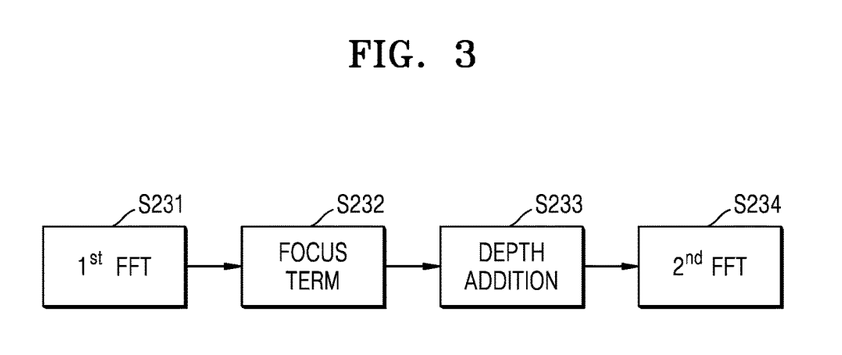
FIG. 3 is a detailed flowchart of a Fourier calculation process.

FIG. 3 is a detailed flowchart of a Fourier calculation process of operation S230. Referring to FIG. 3, in operation S231, the processor 120 may perform a first 2D FFT based on a distance between the display panel 140 on which a hologram image is to be displayed and an observer's pupil. In operation S232, the processor 120 may perform a focus term calculation by using the depth information. In operation S233, the processor 120 may perform a depth addition for adding items of depth image data regarding the plurality of layers. In operation S234, the processor 120 may perform a second 2D FFT based on the observer's pupil and a retina.

Figure 4:
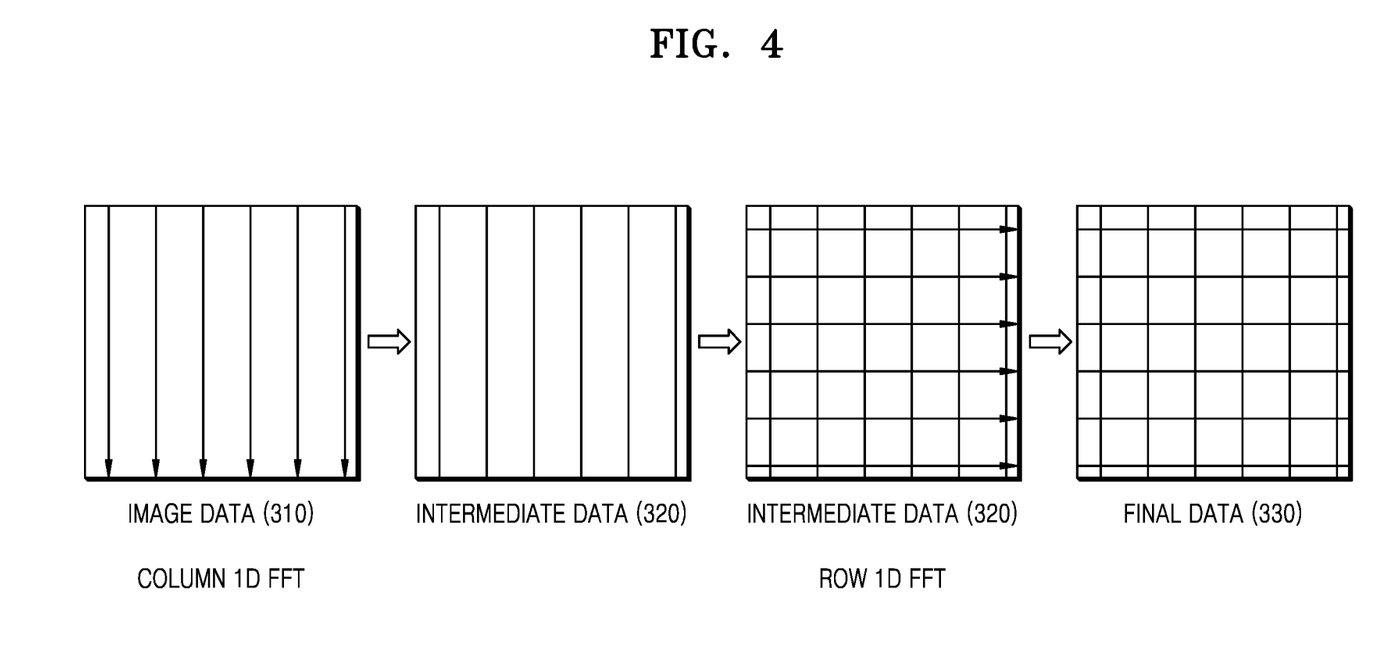
FIG. 4 shows an example of a process of transforming input image data during a Fourier calculation process.

FIG. 4 shows an example of a process of transforming input image data during a Fourier calculation process. Referring to FIG. 4, the processor 120 may generate final data 330 by performing a 1D FFT twice on image data 310 (first 2D FFT). For example, the processor 120 may perform a 1D FFT once on the image data 310 column-wise to generate intermediate data 320 and then may perform a 1D FFT once on the intermediate data 320 row-wise to generate the final data 330.

In this regard, the image data 310 may be color image data of one layer among color image data separated into a plurality of layers. The intermediate data 320 may represent a result of performing the 1D FFT on the image data 310 column-wise. An arrow indicated in the image data 310 may denote a direction in which the processor 120 performs the 1D FFT. A straight line indicated in the intermediate data 320 may denote a direction in which the image data 310 is transformed. The processor 120 may store the obtained intermediate data 320 in the memory 130.

Next, the processor 120 may read the stored intermediate data 320 from the memory 130 and perform the 1D FFT row-wise. When reading the intermediate data 320 from the memory 130, the processor 120 may read the intermediate data 320 row-wise and output the intermediate data 320 to each 1D FFT processor. The processor 120 may perform the 1D FFT on the intermediate data 320 row-wise to generate the final data 330. The final data 330 may be data obtained by performing the 1D FFT on the image data 310 column-wise and row-wise.

Figure 5:
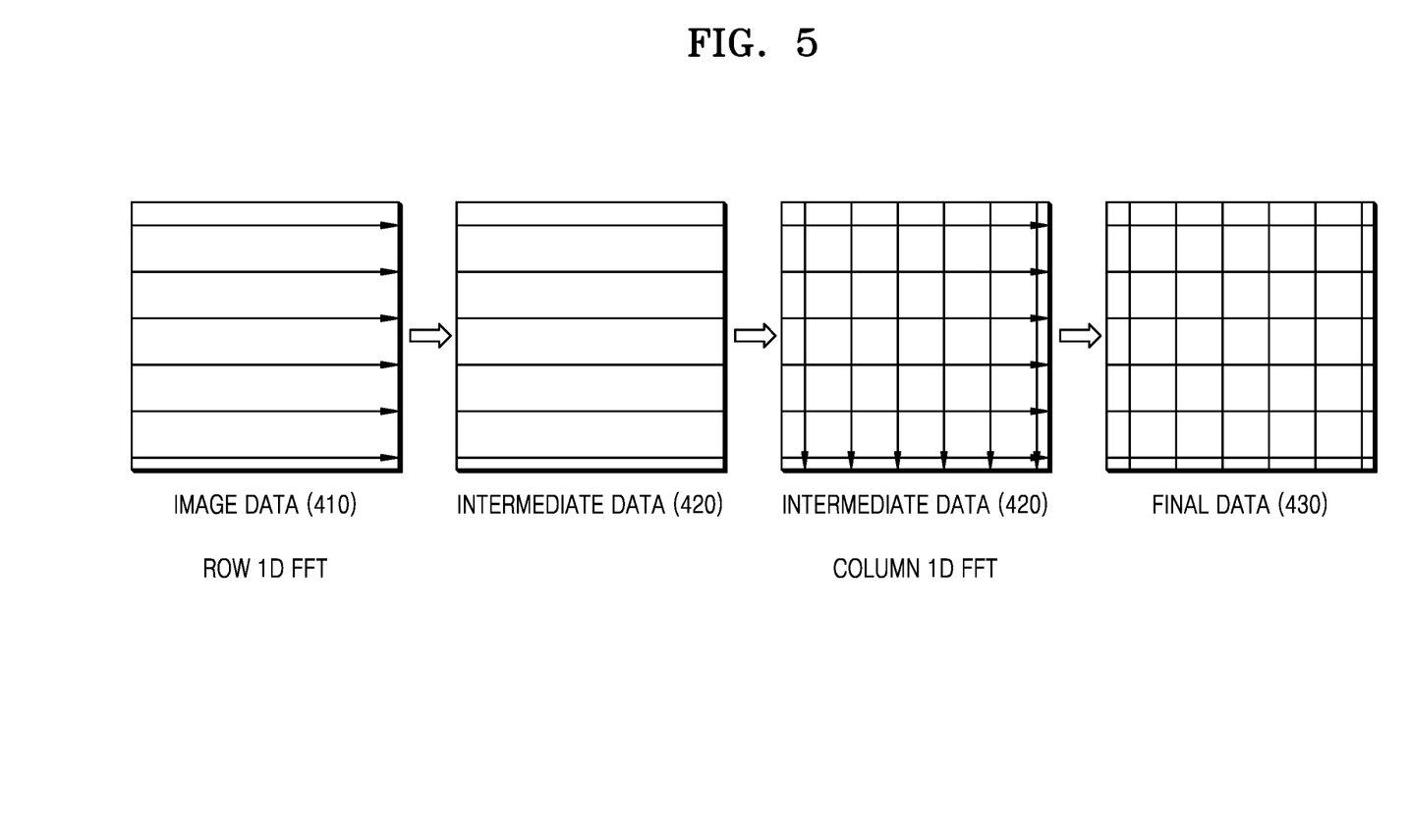
FIG. 5 shows another example of a process of transforming input image data during a Fourier calculation process.

In FIG. 4, a case in which the processor 120 performs the 1D FFT first column-wise is described as an example. However, this is merely an example, and the processor 120 may perform the 1D FFT first row-wise. For example, FIG. 5 shows another example of a process of transforming input image data during a Fourier calculation process. Referring to FIG. 5, the processor 120 may generate final data 430 by performing a 1D FFT twice on image data 410. For example, the processor 120 may perform a 1D FFT once on the image data 410 row-wise to generate intermediate data 420 and then may perform a 1D FFT once on the intermediate data 420 column-wise to generate the final data 430. In FIGS. 4 and 5, the order of a column and a row is switched, and the description presented in FIG. 4 may be identically applied to the description of FIG. 5.

FIGS. 4 and 5 illustrate only the operation of performing a first 2D FFT (operation S231). The processor 120 may additionally perform the second 2D FFT operation (operation S234) after performing the first 2D FFT operation (operation S231). In this regard, the first 2D FFT operation (operation S231) is an operation of performing an FFT from the display panel 140 to the observer's pupil, and the second 2D FFT operation (operation S234) is an operation of performing an FFT from the observer's pupil to an observer's retina. The second 2D FFT operation (operation S234) may also be performed by two 1D FFTs. The second 2D FFT operation (operation S234) may be performed in the same row and column order as the first 2D FFT operation (operation S231). Alternatively, the order of performing the 1D FFT may be reversed in the first 2D FFT operation (operation S231) and the second 2D FFT operation (operation S234). For example, in the case where the 1D FFT is performed twice in the order of column-wise and row-wise when the first 2D FFT operation (operation S231) is performed, the 1D FFT may be performed twice in the order of row-wise and column-wise when the second 2D FFT operation (S234) is performed.

In operation S232, the processor 120 may perform a focus term calculation between the first 2D FFT operation (operation S231) and the second 2D FFT operation (operation S234). In the focus term calculation, the final data 330 obtained by performing the first 2D FFT may be multiplied by a focus term value influenced by a coordinate, and then, frequency filtering may be performed. For example, a focus term value multiplied by the final data 330 obtained by performing the first 2D FFT on color image data of one layer may indicate a location of the layer depth-wise. The focus term value may be previously determined according to a depth of the layer and be stored.

The first 2D FFT and the focus term calculation are performed on each of a plurality of separated items of per-layer data of image data. In the depth addition operation (operation S233), one piece of image data is created by merging the plurality of items of per-layer data. For example, after performing the focus term calculation, the processor 120 generates one piece of left eye image data by adding a plurality of items of per-layer data of left eye image data. Also, the processor 120 generates one piece of right eye image data by adding a plurality of items of per-layer data of right eye image data. Then, the second 2D FFT is performed on each of the left eye image data and the right eye image data.

Then, in operation S240, prism phase computation may be performed to adjust locations where a left eye hologram image and a right eye hologram image are reproduced. The prism phase computation may reproduce hologram images corresponding to the left and right eyes in a noise-free space by avoiding lattice point noise generated by a physical pixel structure of the display panel 140. The processor 120 may multiply result data after the second 2D FFT by a certain complex value (that is, a prism phase filter) to provide sine waves repeating according to a certain cycle to the CGH in the prism phase computation. The certain complex value may be previously determined according to a location where a hologram image is reproduced.

The Fourier calculation operation (operation S230) and the prism phase computation operation (operation S240) may be separately performed on each of the left eye image data and the right eye image data. Then, in a left and right addition operation (operation S250), the processor 120 may generate one piece of image data by adding the left eye image data and the right eye image data. Although FIG. 2 shows performing the prism phase computation operation (operation S240) first and then performing the left and right addition operation (operation S250), the order of the prism phase computation operation (operation S240) and the left and right addition operation (operation S250) may be reversed. For example, when the left and right addition operation (operation S250) is performed first, the prism phase computation operation (operation S240) may be performed on one piece of image data resulting from the left and right addition.

In operation S260, the processor 120 performs pixel encoding. The processor 120 finally generates CGH data input to the display panel 140 through pixel encoding. In a very narrow sense, pixel encoding means determination of grayscale values respectively represented in a plurality of pixels of the display panel 140. However, in a broad sense, every process after the Fourier calculation operation (operation S230) may be regarded as one process of pixel encoding. For example, in a broad sense, the prism phase computation operation (operation S240) and the left and right addition operation (operation S250) may be included in the pixel encoding operation (operation S260).

In the pixel encoding operation (operation S260), the processor 120 encodes complex values of final complex image data respectively corresponding to pixels of the display panel 140 into integer values. For example, the processor 120 may encode complex values of complex image data into n-bit unsigned integer values. In this regard, n is a natural number. For example, while each pixel of the display panel 140 may represent 256 grayscale values from 0 to 255, the processor 120 may encode complex values of complex image data into 8-bit unsigned integer values.

According to the present example embodiment, in order to increase quality of a hologram image to be reproduced without significantly increasing the amount of computation of the processor 120, encoding may be performed based on image data obtained by adding image data obtained in the Fourier calculation operation (operation S230) to image data obtained after the prism phase computation operation (operation S240) instead of performing encoding with merely the image data obtained after the prism phase computation operation (operation S240). In a first comparison example in which encoding is performed with merely a real part value in complex image data after prism phase computation, a contrast ratio is high, whereas crosstalk increases. In a second comparison example in which encoding is performed by adding an absolute value of a complex value to a real part value of complex image data after prism phase computation, quality of the hologram image may increase with improvement of the crosstalk problem, whereas the amount of computation of the processor 120 increases. For example, in the second comparison example, compared to the first comparison example, two square operations, one addition operation, one root operation, and one addition operation are added with respect to each piece of pixel data, and accordingly, the amount of computation of the processor 120 significantly increases.

Figure 6:
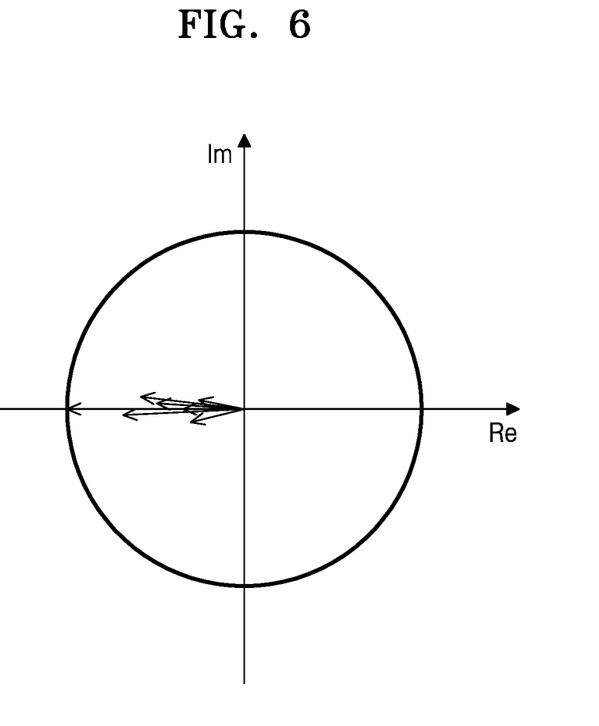
FIG. 6 is a graph showing an example of result values after a Fourier calculation on items of complex image data respectively corresponding to a plurality of pixels of a display panel, the result values displayed on a complex plane.
Figure 7:
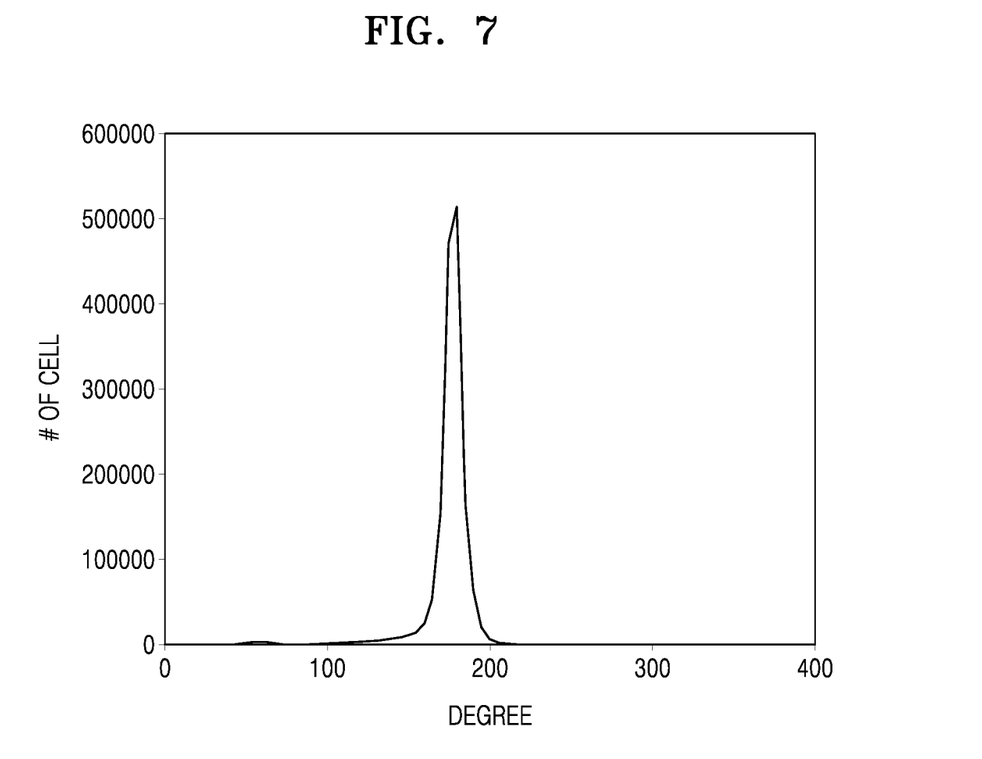
FIG. 7 is a graph showing an example of shift direction distribution of result values after a Fourier calculation on items of complex image data respectively corresponding to a plurality of pixels of a display panel.

Hereinafter, an encoding method according to the present example embodiment will be described in detail. FIG. 6 is a graph showing an example of result values after a Fourier calculation on items of complex image data respectively corresponding to a plurality of pixels of the display panel 140, the result values displayed on a complex plane. FIG. 7 is a graph showing an example of shift direction distribution of result values after a Fourier calculation on items of complex image data respectively corresponding to a plurality of pixels of the display panel 140. Referring to FIG. 6, in the items of complex image data after Fourier calculation, real parts have negative values and values of imaginary parts are close to 0. Accordingly, as shown in FIG. 7, most of the items of complex image data on the complex plane are distributed around a 180-degree direction.

When complex image data after Fourier calculation is denoted by $x+jy$ and a complex value of a prism phase filter for prism phase computation is denoted by $z+jw$, complex image data after prism phase computation may be denoted by $(x+jy)(z+jw)=(xz-yw)+j(xw+yz)$, which is the product of the complex image data after Fourier calculation and the complex value of a prism phase filter. In this regard, an absolute value of the complex value of a prism phase filter is 1, which does not affect a grayscale value after encoding (that is, $|z+jw|=1$).

In the first comparison example, encoding is performed with merely a value of $(xz-yw)$, which is a real part. In the second comparison example, encoding is performed by adding an absolute value of $(x+jy)(z+jw)$ to $(xz-yw)$. That is, in the second comparison example, encoding is performed by using a value of $(xz-yw)+|(x+jy)(z+jw)|$. In this regard, $|(x+jy)(z+jw)|=|(x+jy)||(z+jw)|$ is satisfied, and $|z+jw|=1$ is satisfied, and accordingly, $|(x+jy)(z+jw)|=|(x+jy)|$ is satisfied. In addition, $|(x+jy)|=(x^2+y^2)^{1/2}$ is satisfied, and accordingly, in the second comparison example, encoding is performed with a value of $(xz-yw)+(x^2+y^2)^{1/2}$.

However, as shown in FIGS. 6 and 7, in $x+jy$, the complex image data after Fourier calculation, $x<0$ is satisfied, and approximate distribution of y values for the plurality of pixels is very close to 0 (that is, $y\sim0$). Based on this, in the present example embodiment, encoding may be simply performed with merely a value of $(xz-yw)+|x|$. In other words, encoding may be performed by adding $|x|$, which is an absolute value of a real part of the complex image data after Fourier calculation, and $(xz-yw)$, which is a real part of the complex image data after prism phase computation. According to the present example embodiment, a result approximately similar to that obtained in the second comparison example may be obtained simply by adding merely one addition operation compared to the first comparison example. Accordingly, the amount of computation of the processor 120 may be significantly reduced compared to the second comparison example. In addition, more image information is provided to the display panel 140 compared to the first comparison example, and accordingly, quality of a hologram image may increase, for example, a luminance and a contrast ratio of a hologram image to be reproduced may increase, and crosstalk may decrease.

Figure 8A:
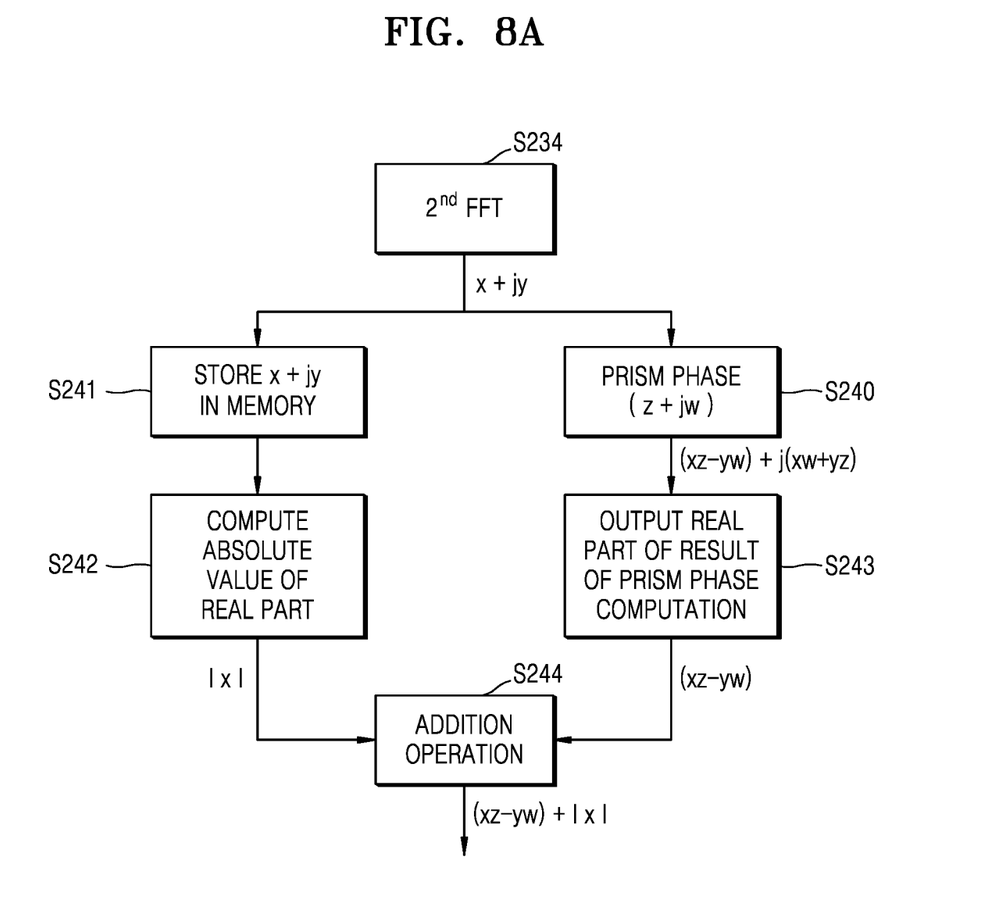
FIG. 8A is a flowchart showing an example of an encoding method for increasing quality of a hologram image to be reproduced, according to an example embodiment.

FIG. 8A is a flowchart showing an example of an encoding method for increasing quality of a hologram image to be reproduced, according to an example embodiment. Referring to FIG. 8A, when the second 2D FFT operation (operation S234) is completed, the processor 120 performs the prism phase computation operation (operation S240) based on a result of the second 2D FFT $(x+jy)$. For example, the processor 120 may multiply a result of the second 2D FFT $(x+jy)$ by a prism phase filter value $(z+jw)$. At the same time as performing the prism phase operation, the processor 120 stores the result of the second 2D FFT in the memory 130 (operation S241). Then, the processor 120 outputs a real part $(xz-yw)$ from a result of the prism phase computation $(xz-yw)+j(xw+yz)$ (operation S243), and at the same time, the processor 120 outputs a real part of the result of the second 2D FFT stored in the memory 130 and computes an absolute value of the real part, $|x|$ (operation S242). In addition, the processor 120 performs an addition operation by adding the absolute value of the real part of the result of the second 2D FFT to the real part of the result of the prism phase computation operation and outputs the result $(xz-yw)+|x|$ (operation S244). Then, in the pixel encoding operation (operation S260), a value of $(xz-yw)+|x|$ may be, for example, transformed into an 8-bit integer value.

Figure 8B:
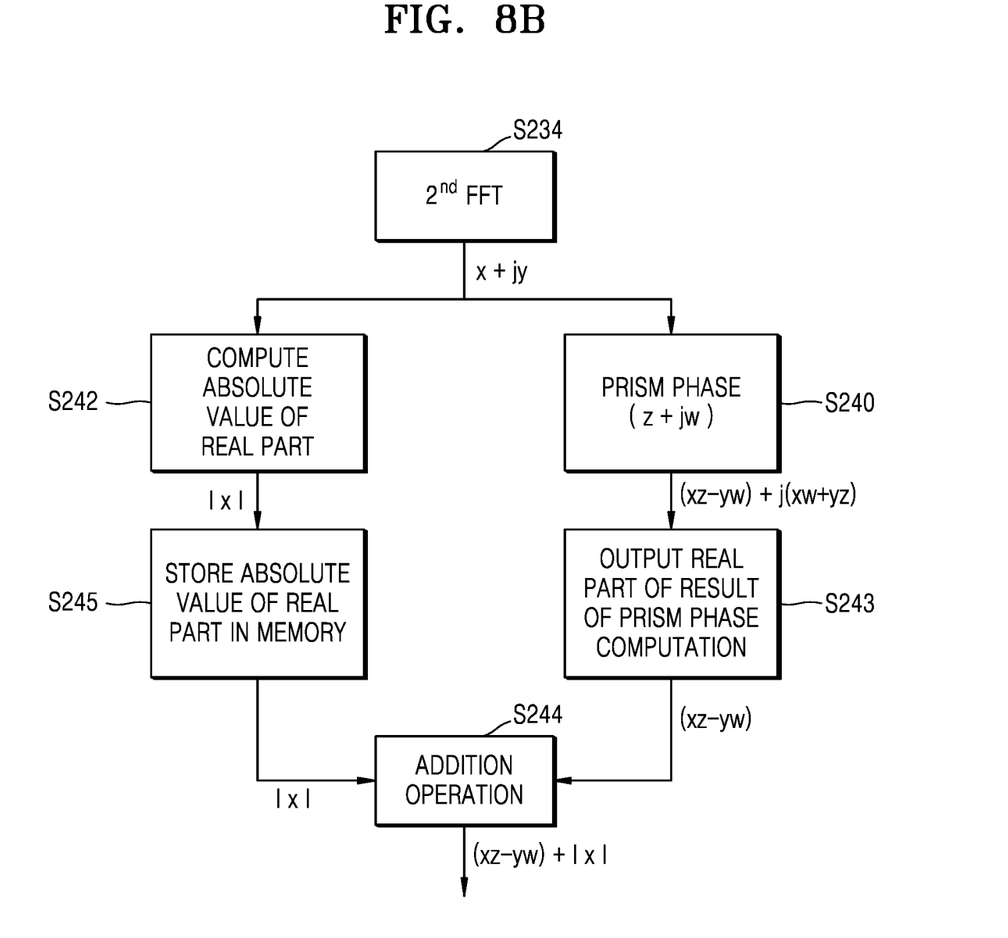
FIG. 8B is a flowchart showing an example of an encoding method for increasing quality of a hologram image to be reproduced, according to another example embodiment.

FIG. 8B is a flowchart showing an example of an encoding method for increasing quality of a hologram image to be reproduced, according to another example embodiment. Referring to FIG. 8B, the processor 120 performs the prism phase computation operation (operation S240) based on a result of the second 2D FFT, and at the same time, the processor 120 computes an absolute value of a real part from the result of the second 2D FFT (operation S242). In addition, the processor 120 stores the absolute value of the real part of the result of the second 2D FFT in the memory 130 (operation S245). When the prism phase computation operation (operation S240) is completed, the processor 120 outputs a real part from a result of the prism phase computation operation (operation S243). Then, the processor 120 outputs the absolute value of the real part of the result of the second 2D FFT stored in the memory 130 and adds the absolute value of the real part of the result of the second 2D FFT to the real part of the result of the prism phase computation operation (operation S244). Then, in the pixel encoding operation (operation S260), a value of (xz−yw)+ |x| may be, for example, transformed into an 8-bit integer value.

The pixel encoding operation (operation S260) may further include scaling and gamma correction in some cases. Scaling may be scaling transformation of image data of low resolution (e.g., FHD) into image data of high resolution (e.g., UHD). Specifically, interpolation may be performed on the image data of low resolution to up-scale the image data of low resolution to the image data of high resolution. For example, nearest-neighbor interpolation, bilinear interpolation, bicubic interpolation, etc. may be used in scaling. Also, gamma correction refers to adjustment of brightness of a hologram image to be reproduced.

Finally, in operation S270, the processor 120 may provide the generated CGH image data to the display panel 140 to allow the display panel 140 to display a hologram pattern. A light source (may provide illumination light to the display panel 140, and a hologram image that may be viewed by an observer in a virtual 3D space may be reproduced while the illumination light is diffracted by the hologram pattern displayed on the display panel 140.

As described above, the order of the prism phase computation operation (operation S240) and the left and right addition operation (operation S250) may be reversed. For example, when the left and right addition operation (operation S250) is performed first, the processor 120 individually performs a Fourier calculation on each of left eye image data and right eye image data and then adds the left eye image data and the right eye image data. Then, based on one piece of image data resulting from the left and right addition, as shown in FIG. 8A or FIG. 8B, the processor 120 may perform prism phase computation and may perform a process of extracting a real part from complex image data by using a result of the Fourier calculation and a result of the prism phase computation.

On the other hand, when the prism phase computation operation (operation S240) is performed first, the processor 120 may individually perform the process shown in FIG. 8A or FIG. 8B with respect to each of left eye image data and right eye image data. In other words, the processor 120 may generate transformed left eye image data by adding an absolute value of a real part of complex image data after a Fourier calculation on the received left eye image data and a real part of complex image data after prism phase computation on the left eye image data. Likewise, the processor 120 may generate transformed right eye image data by adding an absolute value of a real part of complex image data after a Fourier calculation on the received right eye image data and a real part of complex image data after prism phase computation on the right eye image data. Then, the processor 120 may add the left eye image data and the right eye image data obtained through the addition operation (operation S244) shown in FIG. 8A or FIG. 8B before performing the pixel encoding operation (operation S260).

Instead, the processor 120 may individually perform the Fourier calculation operation (operation S230) and the prism phase computation operation (operation S240) on each of the left eye image data and the right eye image data and then may add the left eye image data and the right eye image data transformed through the prism phase computation to obtain one piece of complex image data. Then, the processor 120 may perform operations S241, S242, S243, and S244 shown in FIG. 8A or operations S242, S243, S245, and S244 shown in FIG. 8B on the complex image data resulting from left and right addition to extract a real part.

Figure 9:
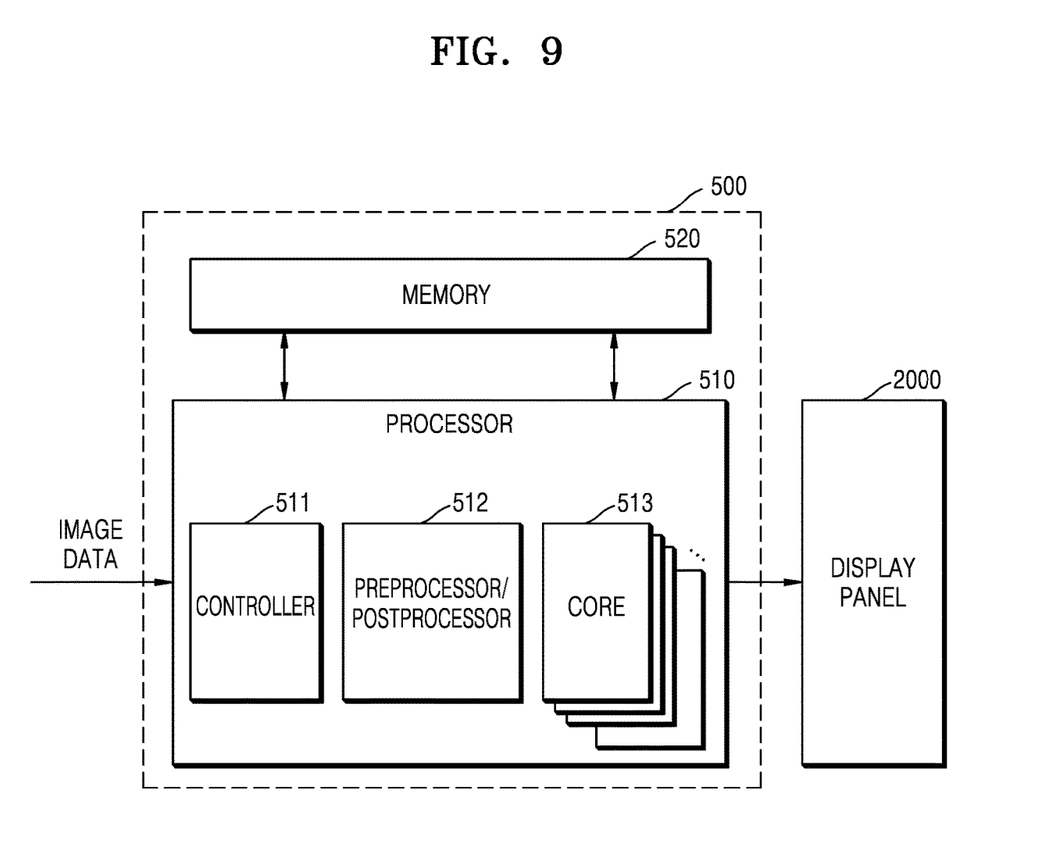
FIG. 9 is a schematic block diagram of a structure of an image processing apparatus for processing hologram image data, according to another example embodiment.

FIG. 9 is a schematic block diagram of a structure of an image processing apparatus 500 for processing hologram image data, according to another example embodiment. Referring to FIG. 9, the image processing apparatus 500 may include a processor 510 and a memory 520.

The processor 510 may process image data input to the image processing apparatus 500 to generate CGH image data. For example, the processor 510 may include a controller 511, a preprocessor/postprocessor 512, and at least one core 513. Also, the processor 510 may include a plurality of cores 513. The controller 511, the preprocessor/postprocessor 512, and the at least one core 513 may be implemented as a single microprocessor chip or a plurality of microprocessor chips.

The core 513 may perform an FFT on data. When the processor 510 includes the plurality of cores 513, each of the cores 513 may perform an FFT in parallel. Specifically, each of the cores 513 may perform, in parallel, the FFT described above with reference to FIGS. 4 and 5.

The controller 511 may generally control an operation of the processor 510. In other words, the controller 511 may control operations of the preprocessor/postprocessor 512 and the core 513.

The preprocessor/postprocessor 512 may process data to be input to the core 513 and data output from the core 513. In this regard, the data to be input to the core 513 and the data output from the core 513 may include the image data 310 and 410, the intermediate data 320 and 420, and the final data 330 and 430 described above with reference to FIGS. 4 and 5. More specifically, the input image data 310 and 410 may be stored in the memory 520. Thereafter, the CGH image data may be finally generated by the operations of the preprocessor/postprocessor 512 and the core 513 using the image data 310 and 410. In this process, the intermediate data 320 and 420 and the final data 330 and 430 may be generated, and the CGH image data may be generated by performing prism phase computation, left and right addition, and encoding based on the final data 330 and 430. The preprocessor/postprocessor 512 may perform preprocessing on the data to be input to the core 513 and post-processing on the data output from the core 513.

The image processing apparatus 500 may be connected to a display panel 2000. The display panel 2000 may display a hologram pattern by using the CGH image data generated by the image processing apparatus 500.

The apparatus according to the present example embodiments may include a processor, a memory for storing and executing program data, a permanent storage such as a disk drive, a communication port for communication with an external device, a user interface device such as a touch panel, a key, a button, etc. The methods embodied as a software module or an algorithm may be stored in a non-transitory computer-readable recording medium as computer-readable code or program commands executable on the processor. Examples of the non-transitory computer-readable recording medium include magnetic storage media (e.g., read-only memory (ROM), random-access memory (RAM), floppy disks, hard disks, etc.) and optical reading media (compact disc read-only memory (CD-ROM), digital versatile disc (DVD), etc.) The non-transitory computer-readable recording medium may also be distributed over network-coupled computer systems to store and execute computer-readable code in a distributed fashion. The medium may be read by computers, may be stored in the memory, and may be executed on the processor.

The particular implementations shown and described herein are illustrative examples and are not intended to otherwise limit the scope in any way. For the sake of brevity, conventional electronics, control systems, software development and other functional aspects of the systems may not be described in detail. Furthermore, the connecting lines or connectors shown in the various figures presented are intended to represent exemplary functional relationships and/or physical or logical couplings between the various elements, and many alternative or additional functional relationships, physical connections, or logical connections may be present in a practical device.

It should be understood that example embodiments described herein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. An image processing apparatus comprising:
   a receiver configured to receive image data; and
   a processor configured to:
   generate first data by performing a Fourier calculation on the received image data,
   generate second data by performing prism phase computation on the first data,
   generate third data by adding the first data and the second data, and
   perform encoding based on the third data.

2. The image processing apparatus of claim 1, wherein the processor is further configured to generate the third data by adding an absolute value of a real part of the first data and a real part of the second data.

3. The image processing apparatus of claim 2, further comprising:
   a memory configured to store the first data while the processor performs the prism phase computation,
   wherein the processor is further configured to generate the third data by outputting the real part of the first data stored in the memory and computing the absolute value of the real part of the first data output from the memory.

4. The image processing apparatus of claim 2, further comprising:
   a memory;
   wherein the processor is further configured to:
   compute the absolute value of the real part of the first data and store the absolute value of the real part of the first data while performing the prism phase computation, and
   generate the third data by outputting the absolute value of the real part of the first data stored in the memory and adding the absolute value of the real part of the first data output from the memory and the real part of the second data.

5. The image processing apparatus of claim 1, wherein the processor is further configured to perform the prism phase computation by multiplying the first data by a prism phase filter value.

6. The image processing apparatus of claim 5, wherein the first data is denoted by a complex number x+jy, the prism phase filter value is denoted by a complex number z+jw, the second data is denoted by a complex number (xz−yw)+j(xw+yz), and the third data is denoted by (xz−yw)+|x|.

7. The image processing apparatus of claim 6, wherein an absolute value |z+jw| of the prism phase filter value is 1.

8. The image processing apparatus of claim 1, wherein the processor is further configured to encode the third data into n-bit unsigned integer values, and n is a natural number.

9. The image processing apparatus of claim 1, wherein the processor is further configured to generate the first data by performing a first Fourier calculation based on a distance between a display on which an image is to be displayed and an observer's pupil, performing a focus term calculation and a depth addition, and performing a second Fourier calculation based on a distance between the observer's pupil and a retina.

10. The image processing apparatus of claim 1, wherein the processor is further configured to generate the first data, generate the second data, and generate the third data individually for each of left eye image data and right eye image data and add the left eye image data and the right eye image data before performing the encoding based on the third data.

11. The image processing apparatus of claim 1, wherein the processor is further configured to generate the first data individually for each of left eye image data and right eye image data and add the left eye image data and the right eye image data before generating the second data and the third data.

12. An image processing method comprising:
   receiving image data;
   generating first data by performing a Fourier calculation on the received image data;
   generating second data by performing prism phase computation on the first data;
   generate third data by adding the first data and the second data; and
   performing encoding based on the third data.

13. The image processing method of claim 12, wherein the generating the third data comprises adding an absolute value of a real part of the first data and a real part of the second data.

14. The image processing method of claim 13, further comprising:
   storing the first data in a memory during the prism phase computation,
   wherein the generating the third data comprises outputting the real part of the first data stored in the memory and computing the absolute value of the real part of the first data output from the memory.

15. The image processing method of claim 13, further comprising:
   computing the absolute value of the real part of the first data and storing the absolute value of the real part of the first data in a memory while performing the prism phase computation,
   wherein the generating the third data comprises outputting the absolute value of the real part of the first data stored in the memory and adding the absolute value of the real part of the first data output from the memory and the real part of the second data.

16. The image processing method of claim 12, wherein the performing the prism phase computation comprises multiplying the first data by a prism phase filter value.

17. The image processing method of claim 16, wherein the first data is denoted by a complex number x+jy, the prism phase filter value is denoted by a complex number z+jw, the second data is denoted by a complex number (xz−yw)+j(xw+yz), and the third data is denoted by (xz−yw)+|x|.

18. The image processing method of claim 17, wherein an absolute value |z+jw| of the prism phase filter value is 1.

19. The image processing method of claim 12, wherein the performing the encoding comprises encoding the third data into n-bit unsigned integer values, and n is a natural number.

20. The image processing method of claim 12, wherein the generating the first data by performing the Fourier calculation comprises:
  performing a first Fourier calculation based on a distance between a display on which an image is to be displayed and an observer's pupil;
  performing a focus term calculation and a depth addition; and
  performing a second Fourier calculation based on a distance between the observer's pupil and a retina.

21. The image processing method of claim 12, wherein the generating the first data, the generating the second data, and the generating the third data are performed individually for each of left eye image data and right eye image data, and
  wherein the image processing method further comprises adding the left eye image data and the right eye image data before the performing the encoding based on the third data.

22. The image processing method of claim 12, wherein the generating the first data is performed individually for each of left eye image data and right eye image data, and
  wherein the image processing method further comprises adding the left eye image data and the right eye image data before the generating of the second data and the third data.

23. A non-transitory computer-readable recording medium having recorded thereon a program which is executed by a computer to perform an image processing method comprising:
  receiving image data;
  generating first data by performing a Fourier calculation on the received image data;
  generating second data by performing prism phase computation on the first data;
  generate third data by adding the first data and the second data; and
  performing encoding based on the third data.

* * * * *